United States Patent
Chiang

(10) Patent No.: US 8,149,078 B2
(45) Date of Patent: Apr. 3, 2012

(54) FAST ANCHORING MAGNETIC HOLDER INCLUDING MULTIPLE ATTRACTIVE SURFACES

(76) Inventor: Wen-Hsuan Chiang, Taichung (TW)

( * ) Notice: Subject to any disclaimer, the term of this patent is extended or adjusted under 35 U.S.C. 154(b) by 122 days.

(21) Appl. No.: 12/839,180

(22) Filed: Jul. 19, 2010

(65) Prior Publication Data

US 2012/0013426 A1    Jan. 19, 2012

(51) Int. Cl.
*H01F 7/20* (2006.01)
*H01F 7/02* (2006.01)

(52) U.S. Cl. .................................. 335/285; 335/288

(58) Field of Classification Search .................. 335/285, 335/286, 288
See application file for complete search history.

(56) References Cited

U.S. PATENT DOCUMENTS

| | | | | |
|---|---|---|---|---|
| 2,209,558 A * | 7/1940 | Bing et al. | | 335/295 |
| 4,250,478 A * | 2/1981 | Cardone et al. | | 335/288 |
| 4,314,219 A * | 2/1982 | Haraguchi | | 335/295 |
| 5,435,613 A * | 7/1995 | Jung | | 294/65.5 |
| 6,076,873 A * | 6/2000 | Jung | | 294/65.5 |
| 6,331,810 B1 * | 12/2001 | Jung | | 335/288 |
| 6,854,777 B2 * | 2/2005 | Jung | | 294/65.5 |
| 7,049,919 B2 * | 5/2006 | Yamaki | | 335/288 |
| 7,224,251 B2 * | 5/2007 | Wang | | 335/285 |
| 7,548,147 B2 * | 6/2009 | Chiang | | 335/285 |

FOREIGN PATENT DOCUMENTS

TW    093208528    3/2005

\* cited by examiner

*Primary Examiner* — Elvin G Enad
*Assistant Examiner* — Alexander Talpalatskiy
(74) *Attorney, Agent, or Firm* — Muncy, Geissler, Olds & Lowe, PLLC

(57) ABSTRACT

A fast anchoring magnetic holder including multiple attractive surfaces comprises a first magnet, a second magnet, a first insertion rod and a second insertion rod. The first magnet has a magnetic workstation surface. The second magnet has a magnetic anchor surface. The first and second magnets are stacked together. The first insertion rod and second insertion rod are respectively inserted into the first magnet and second magnet, and are turned to change distribution of the magnetic field of the first magnet and second magnet to alter the magnetic workstation surface and magnetic anchor surface from a non-magnetic state to a magnetic state to attract a working piece to a workstation.

4 Claims, 5 Drawing Sheets

FAST ANCHORING MAGNETIC HOLDER INCLUDING MULTIPLE ATTRACTIVE SURFACES

FIELD OF THE INVENTION

The present invention relates to a magnetic disk and particularly to a fast anchoring magnetic holder including multiple attractive surfaces.

BACKGROUND OF THE INVENTION

R.O.C. Patent application No. 093208528 entitled "Switch-type permanent magnetic workstation fixture system", referring to FIG. 1, includes a magnetic disk 1, an attractive surface 2, a rotary rod 3 and an anchor element 4. The attractive surface 2 and anchor element 4 are located at two sides of the magnetic disk 1. The rotary rod 3 is inserted into the magnetic disk 1. The distribution of magnetic lines of the magnetic disk 1 can be changed by turning the rotary rod 3 to make the attractive surface 2 magnetized or demagnetized. The anchor element 4 aims to fasten to a workstation. When the attractive surface 2 is magnetized, it can attract a working piece. When the attractive surface 2 is demagnetized, it does not have magnetic attraction, then the working piece can be removed easily.

When in use, the anchor element 4 is screwed on the workstation to anchor the magnetic disk 1. When the attractive surface 2 is demagnetized, the working piece is positioned on the attractive surface 2, then turn the rotary rod 3 to make the attractive surface 2 magnetized to attract and hold the working piece. Turn the rotary rod 3 again, the attractive surface 2 can be demagnetized to remove the working piece.

The aforesaid conventional structure anchors the magnetic disk 1 by screwing, but it is easily to be loosened off. Moreover, fasten by screwing takes more time and efforts. It cannot fully meet requirements in practice.

SUMMARY OF THE INVENTION

Therefore, the primary object of the present invention is to provide a fast anchoring switch-type magnetic holder.

The present invention provides a fast anchoring magnetic holder including multiple attractive surfaces to attract a working piece to a workstation. It includes a first magnet, a second magnet, a first insertion rod and a second insertion rod. The first magnet has a magnetic workstation surface to attract the working piece. The second magnet has a magnetic anchor surface to attract to the workstation. The first and second magnets are stacked together. The first insertion rod can be turned to change distribution of the magnetic field of the first magnet and is inserted into the first magnet. The second insertion rod also can be turned to change distribution of the magnetic field of the second magnet and is inserted into the second magnet.

By means of the structure set forth above, by turning the first and second insertion rods, the distribution of the magnetic field of the first and second magnets can be changed to alter the magnetic workstation surface and magnetic anchor surface from a non-magnetic state to a magnetic state. Thereby the working piece can be attracted to the workstation. The magnetic attraction technique provided by the invention can securely hold the working piece without loosening off, and can be performed rapidly with less effort to fully meet using requirements.

The foregoing, as well as additional objects, features and advantages of the invention will be more readily apparent from the following detailed description, which proceeds with reference to the accompanying drawings.

DETAILED DESCRIPTION OF THE PREFERRED

Embodiments

Figure 1:
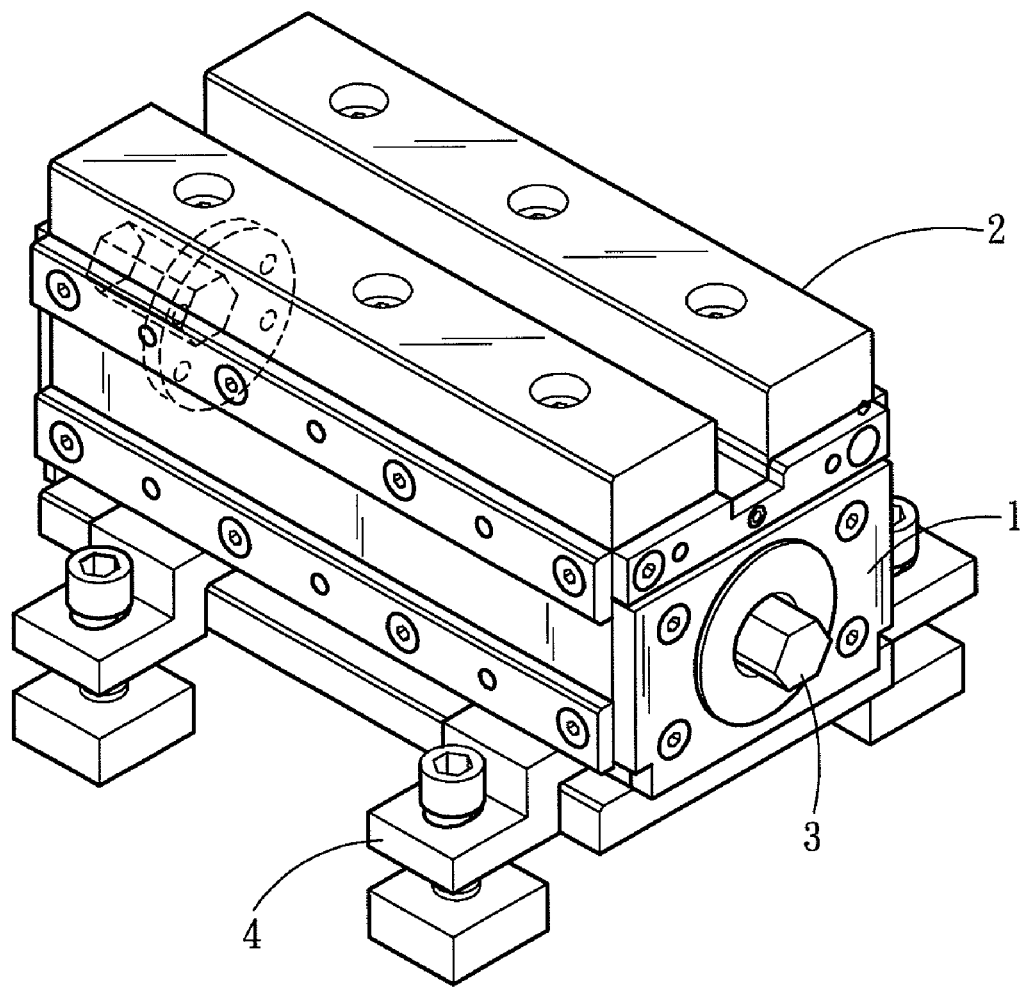
FIG. 1 is a schematic view of a conventional switch-type magnetic holder.
Figure 2:
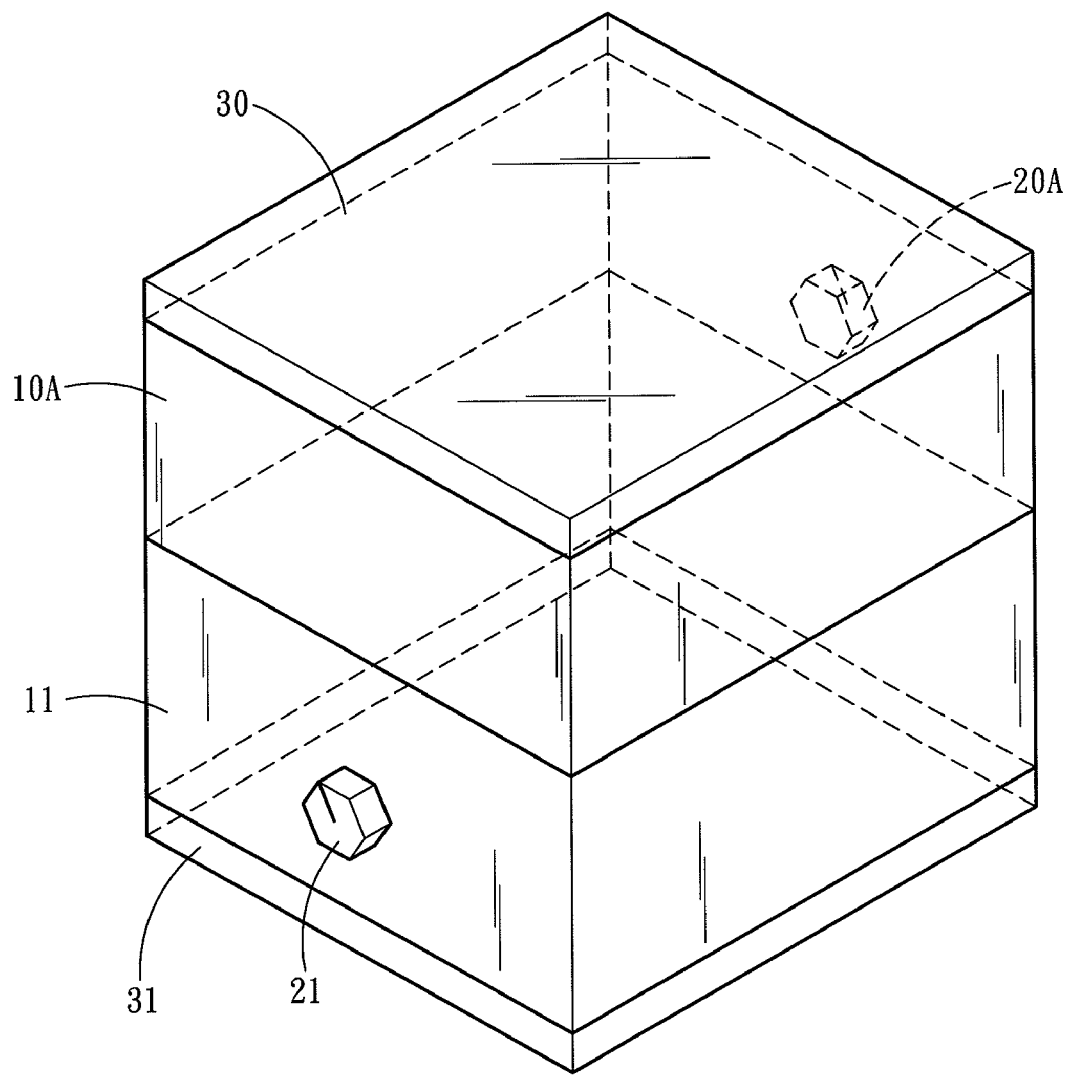
FIG. 2 is a schematic view of the switch-type magnetic holder of the invention.
Figure 3:
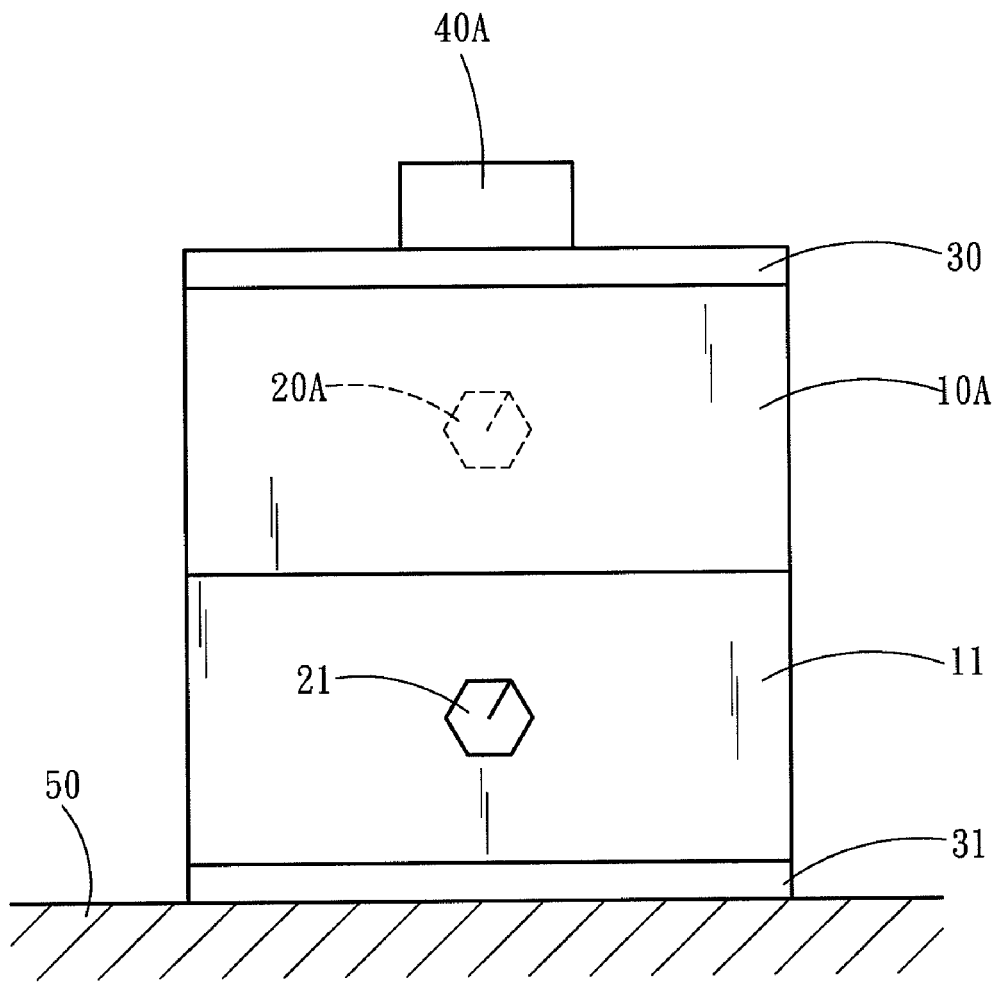
FIG. 3 is a schematic view of the switch-type magnetic holder of the invention in a use condition.

Please refer to FIGS. 2 and 3, the present invention includes a first magnet 10A, a second magnet 11, a first insertion rod 20A and a second insertion rod 21. The first magnet 10A has a magnetic workstation surface 30 to attract a working piece 40A. The second magnet 11 has a magnetic anchor surface 31 to attract to a workstation 50. The first and second magnets 10A and 11 are stacked together such that the magnetic workstation surface 30 and the magnetic anchor surface 31 are located at two opposite sides.

The first insertion rod 20A is inserted into the first magnet 10A and turned to change distribution of the magnetic field of the first magnet 10A to make the first magnet 10A in a non-magnetic state and a magnetic state. Similarly, the second insertion rod 21 is inserted into the second magnet 11 and turned to change distribution of the magnetic field of the second magnet 11 to make the second magnet 11 in a non-magnetic state and a magnetic state. The first and second insertion rods 20A and 21 are inserted into the first and second magnets 10A and 11 from different directions as shown in FIG. 3. When the first and second magnets 10A and 11 are in the magnetic state, they can attract the working piece 40A to the workstation 50.

Figure 4:
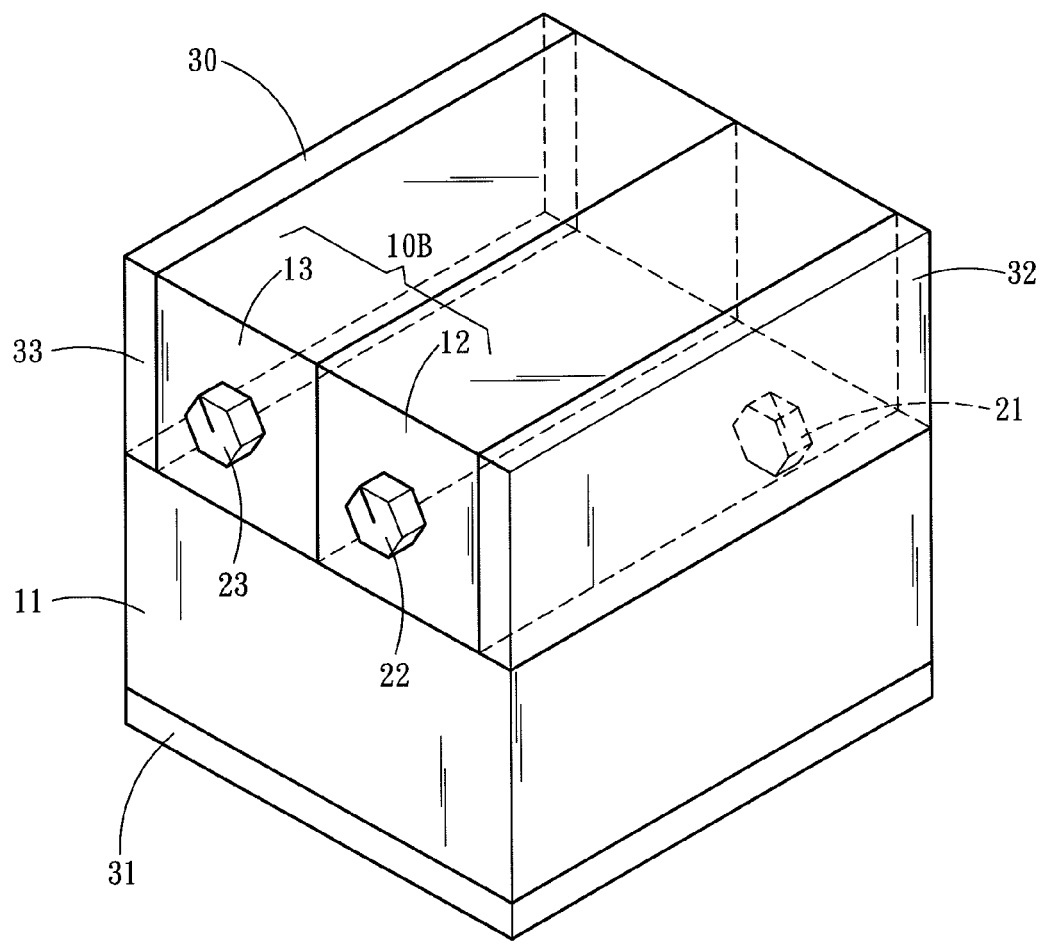
FIG. 4 is a schematic view of another embodiment of the switch-type magnetic holder of the invention.
Figure 5:
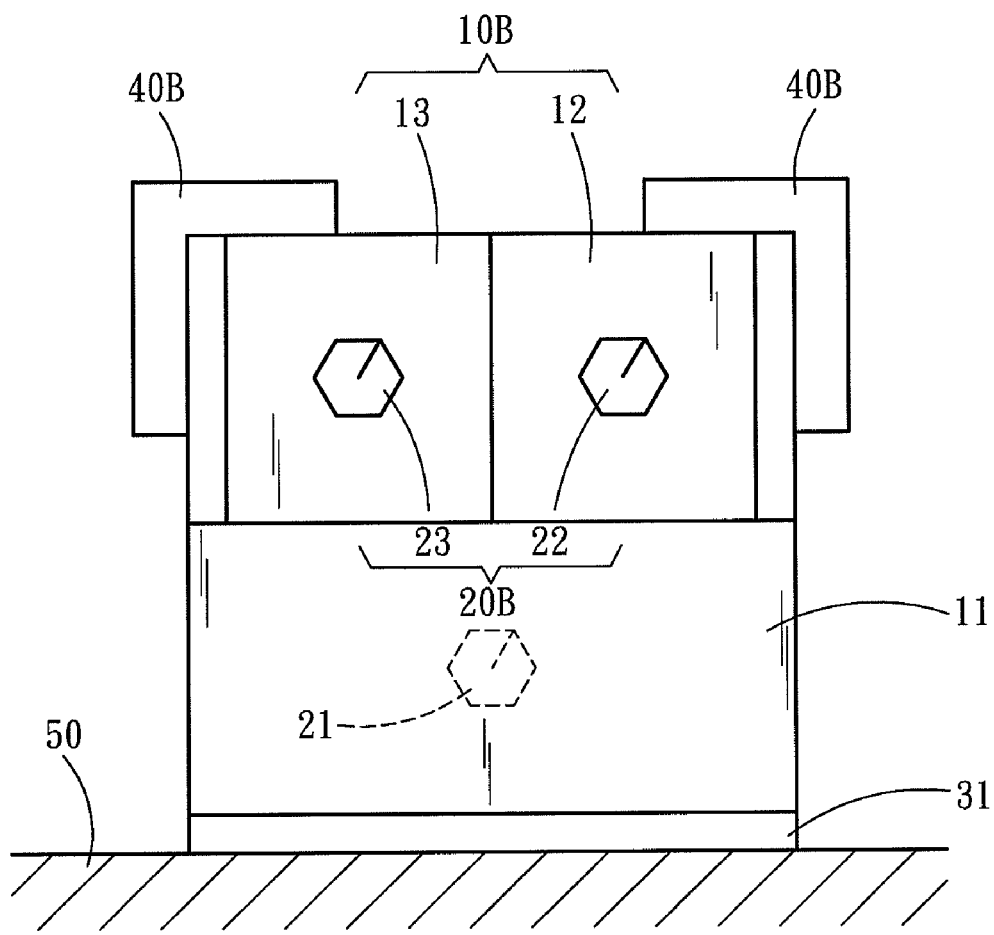
FIG. 5 is a schematic view of another embodiment of the switch-type magnetic holder of the invention in a use condition.

Please refer to FIGS. 4 and 5 for another embodiment of the invention. It has a first magnet 10B including a first right magnet 12 and a first left magnet 13, and a first insertion rod 20B including a first right insertion rod 22 and a first left insertion rod 23. The first right magnet 12 and the first left magnet 13 have respectively a right magnetic workstation surface 32 and a left magnetic workstation surface 33 to attract a working piece 40B.

The first right insertion rod 22 and the first left insertion rod 23 are respectively inserted into the first right magnet 12 and the first left magnet 13. Turn the first right insertion rod 22 and first left insertion rod 23, the distribution of the magnetic field of the first right magnet 12 and first left magnet 13 can be changed to make the first right magnet 12 and first left magnet 13 in a non-magnetic state and a magnetic state.

Referring to FIG. 5, in this embodiment, when the second insertion rod 21 is turned to make the second magnet 11 in the magnetic state, it can be attracted to the workstation 50. When the first right insertion rod 22 and first left insertion rod 23 are turned to make the first right magnet 12 and first left magnet 13 in a magnetic state, the right magnetic workstation surface 32 and left magnetic workstation surface 33 at two sides can attract respectively a working piece 40B to meet special fabrication requirement.

As a conclusion, by turning the first and second insertion rods to change the magnetic field of the first magnet and second magnet can alter the magnetic workstation surface and magnetic anchor surface from a non-magnetic state to a magnetic state, thereby can attract a working piece to a workstation. By employing the magnetic attraction approach, the present invention can securely hold the working piece without loosening off. Operation can be accomplished rapidly with less effort to meet using requirements.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A fast anchoring magnetic holder including multiple attractive surfaces to attract a working piece to a workstation, comprising:
    a first magnet including a magnetic workstation surface to attract the working piece;
    a second magnet including a magnetic anchor surface to attract to the workstation; the first magnet and the second magnet being stacked together such that the magnetic workstation surface and the magnetic anchor surface are located at two opposite sides;
    a first insertion rod inserted into the first magnet and turned to change distribution of magnetic field of the first magnet; and
    a second insertion rod inserted into the second magnet and turned to change distribution of magnetic field of the second magnet.

2. The fast anchoring magnetic holder of claim 1, wherein the magnetic workstation surface and the magnetic anchor surface are located at two sides opposing each other.

3. The fast anchoring magnetic holder of claim 1, wherein the first magnet includes a first right magnet and a first left magnet, the first insertion rod including a first right insertion rod and a first left insertion rod, the first right magnet and the first left magnet respectively including a right magnetic workstation surface and a left magnetic workstation surface to attract the working piece, the first right insertion rod and the first left insertion rod respectively being inserted into the first right magnet and the first left magnet.

4. The fast anchoring magnetic holder of claim 1, wherein the first insertion rod and the second insertion rod are inserted into the first magnet and the second magnet from different directions.

* * * * *